United States Patent [19]

Traxler

[11] Patent Number: 4,996,407

[45] Date of Patent: Feb. 26, 1991

[54] PLASMA ARC TRANSFER CONTROLLER

[75] Inventor: John C. Traxler, Sarasota, Fla.

[73] Assignee: HyperPower, Inc., Sarasota, Fla.

[21] Appl. No.: 332,591

[22] Filed: Apr. 3, 1989

[51] Int. Cl.⁵ ................................................ B23K 9/00
[52] U.S. Cl. ........................ 219/121.54; 219/121.57;
219/130.31; 219/130.4
[58] Field of Search ...................... 219/124.01, 124.02,
219/121.54, 121.57, 121.59, 75, 130.31, 130.4

[56] References Cited

U.S. PATENT DOCUMENTS

| | | | |
|---|---|---|---|
| 4,692,582 | 9/1987 | Mashic | 219/121.57 |
| 4,795,882 | 1/1989 | Hardwick et al. | 219/121.57 |
| 4,814,577 | 3/1989 | Dallavalle et al. | 219/121.57 |
| 4,839,499 | 6/1989 | Kotecki et al. | 219/121.57 |

Primary Examiner—M. H. Paschall
Attorney, Agent, or Firm—Wolf, Greenfield & Sacks

[57] ABSTRACT

The invention comprises a power transfer circuit for a plasma torch for smoothly and linearly transferring the plasma arc from the nozzle of the torch to a workpiece as cutting operation commences and vice versa as cutting operation is completed. The invention includes a switching transistor for alternately providing power to the nozzle or the workpiece and a freewheeling diode coupled between the workpiece and the power source. The transistor is responsive to the voltage differential between the workpiece and the nozzle for transferring the plasma arc therebetween. Below a specified voltage differential, the transistor is turned off such that all power is delivered to the workpiece. Above a specified upper voltage differential, the transistor is turned on and all power is delivered to the nozzle. Between the specified upper and lower voltage differentials, the transistor switches at a specified frequency, the duty cycle of the transistor (i.e., the period of each cycle during which the transistor is turned on) increasing as the voltage differential increases. In a further aspect of the invention, the level of power output is ramped from a first level to a second level as the voltage differential between the nozzle and the workpiece crosses through a third specified voltage threshold.

28 Claims, 2 Drawing Sheets

PLASMA ARC TRANSFER CONTROLLER

FIELD OF THE INVENTION

The invention relates to power transfer circuits. More particularly, the invention relates to apparatus for transferring a plasma arc from the nozzle of a plasma torch to a workpiece and vice versa as the torch is brought close to or moved away from the workpiece.

BACKGROUND OF THE INVENTION

Plasma arc torches are used in industry for cutting metal because of their ability to produce concentrated heat. Typically, a plasma arc torch comprises a nozzle assembly comprising an electrode on which a power supply places a high negative voltage potential with respect to the nozzle body which is grounded. The workpiece on which cutting is to be performed is also connected to the ground of the power source (a higher potential than the negatively charged electrode). The nozzle assembly also comprises a series of fluid outlets which couple between, a gas source and the inner chamber of the nozzle where the electrode is disposed. The outlets surround the electrode so that when gas delivery is initiated, an annular flow of gas is delivered around the electrode in the nozzle assembly. The electromagnetic field surrounding the electrode ionizes the gas thereby forming a plasma arc. Typically, when plasma operation begins the nozzle is coupled to the ground of the power source such that a plasma arc is formed between the electrode and the nozzle. The plasma can be transferred to arc between the electrode and the workpiece rather than the electrode and the nozzle by bringing the nozzle assembly close to the workpiece and disconnecting the nozzle from ground.

In the prior art, a resistor coupled in series with an electro-mechanical relay between the nozzle and the power supply ground was used to disconnect the nozzle from ground when the torch was brought close enough to the workpiece to begin cutting operations. Such a configuration is shown in FIG. 1. In FIG. 1, the power supply is shown at 12, the electrode at 14 and the nozzle at 16. The nozzle 16 is coupled to the ground of the power through resistor 18 and relay K1. The workpiece 20 is also shown coupled to the ground of the power supply 12. When plasma operation is first initiated, relay K1 is closed providing a path for the current in the plasma arc from the negative side of the power supply 12 to the electrode 14, through the plasma arc to nozzle 16, and through resistor 18 and relay K1 back to the ground of the power supply. As the output of power supply 12 is increased, the voltage across resistor 18 increases. When the voltage drop across the resistor 18 reaches a threshold level, it causes the arc to transfer to the workpiece at which time relay K1 can be opened such that the only path to ground is through the workpiece 20.

When the plasma arc is coupled between the electrode 14 and the nozzle 16, it is called pilot arc operation. When the plasma arc is coupled between the electrode 14 and the workpiece 20, it is called cutting arc or torch operation. To return from cutting operation back to pilot arc operation, the current output by the power 12 is reduced to the point where the voltage drop across resistor 18 causes relay K1 to close again providing a path for the current to ground through the nozzle 16.

When the voltage drop across resistor 18 is small enough, the plasma arc again attaches to the nozzle.

In this prior art method of transferring the plasma arc between the nozzle and the workpiece, the relay K1 causes the operation to switch abruptly such that the entire power flow is transferred from the workpiece to the nozzle or vice versa instantaneously. A smooth and/or linear transfer of power is preferable for safety reasons as well as performance reasons. Since the plasma beam in a plasma torch can reach temperatures exceeding 20,000° Kelvin, an abrupt transfer of the plasma arc from the workpiece to the nozzle while the torch is still at full power, could seriously damage or even melt the nozzle.

Therefore, it is an object of the present invention to provide a plasma arc transfer control circuit for a plasma arc torch in which the transfer from pilot arc operation to cutting operation and vice versa is accomplished in a smooth and linear fashion.

It is a further object of the present invention to provide a plasma arc transfer control circuit utilizing feedback of the voltage differential between the workpiece and the nozzle to control plasma arc transfer.

It is yet another object of the present invention to provide a plasma arc transfer control circuit which automatically transfers the plasma arc from cutting operation to pilot arc operation a the workpiece is removed from the vicinity of the torch.

It is one more object of the present invention to provide a plasma torch in which power delivery to the electrode is automatically reduced when the plasma arc is transferred from cutting operation to pilot arc operation.

It is a further object of the present invention to provide an improved power transfer circuit.

SUMMARY OF THE INVENTION

The invention comprises a plasma arc transfer control circuit comprising a transistor switch and a freewheeling diode. The main electrodes of the transistor switch are coupled between the positive node of the power supply and the nozzle. The workpiece is coupled to the positive node of the power supply through a freewheeling diode. Therefore, when the transistor switch is off, i.e., the transistor is reverse biased, all current must flow from the power supply through the freewheeling diode directly to the workpiece and from the workpiece through the plasma arc to the electrode. When the transistor switch is on, i.e., forward biased, the current will flow through the main electrodes of the transistor to the nozzle.

The voltage differential between the workpiece and the nozzle is sensed and, depending on the value of the voltage differential, the transistor switch operates in one of three possible modes. The transistor operates in a first mode when the voltage differential between the workpiece and the nozzle is less than a preset lower level. In this mode, the transistor is reverse biased such that no current is delivered to the nozzle and all current is delivered to the workpiece.

The second mode of operation occurs when the nozzle to workpiece voltage differential exceeds a preset upper level. In this mode, the transistor switch is forward biased and all current will flow through the transistor to the nozzle and from the nozzle to the electrode.

Finally, the third mode of operation occurs when the voltage differential between the nozzle and the workpiece is between the preset upper and lower levels. In this situation, the transistor turns on and off at a rate of 20 kHz. The duty cycle of the transistor (i.e., the percentage of each cycle during which the transistor is on, i.e., forward biased) depends on the voltage differential. As the voltage differential increases, the rate of switching remains at 20 kHz but the duty cycle increases. Therefore, when the voltage differential is equal to the lower preset level, the duty cycle of the transistor is 0% and when the voltage differential is equal to the upper preset level, the duty cycle is 100%. Between the lower and upper levels, the duty cycle increases linearly (e.g. the duty cycle is 50% when the voltage differential is half way between the lower and upper limits).

Therefore, in accordance with the present invention, as the torch is pulled away from the workpiece and the voltage differential between the nozzle and the workpiece increases, the plasma arc is smoothly and linearly transferred from cutting operation to pilot operation. The reverse operation occurs as the torch nozzle assembly is brought into the vicinity of the workpiece.

According to another aspect of the present invention, the voltage differential between the workpiece and the nozzle is also compared with a third preset voltage level which is set somewhere between the lower and upper preset levels. Feedback is provided to a power supply controller which causes the power supply to decrease its current output when the voltage differential between the nozzle and workpiece exceeds the third preset voltage level. In accordance with this aspect of the invention, the power output of the torch is reduced as the portion which is sent to the nozzle exceeds the third preset level. In this manner, the nozzle is protected from receiving large amounts of power which could damage and/or melt the nozzle.

The invention will be better understood when the detailed description herein is read in conjunction with the drawing.

DETAILED DESCRIPTION OF THE INVENTION

Figure 1:
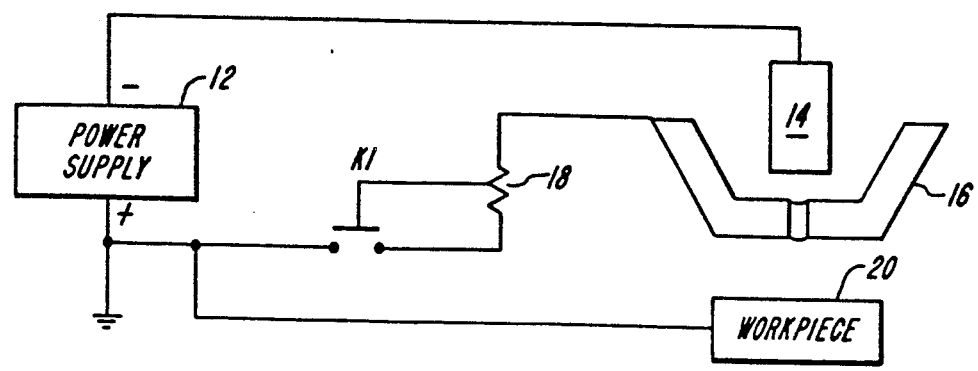
FIG. 1 is a block diagram of a prior art plasma arc transfer circuit.
Figure 2:
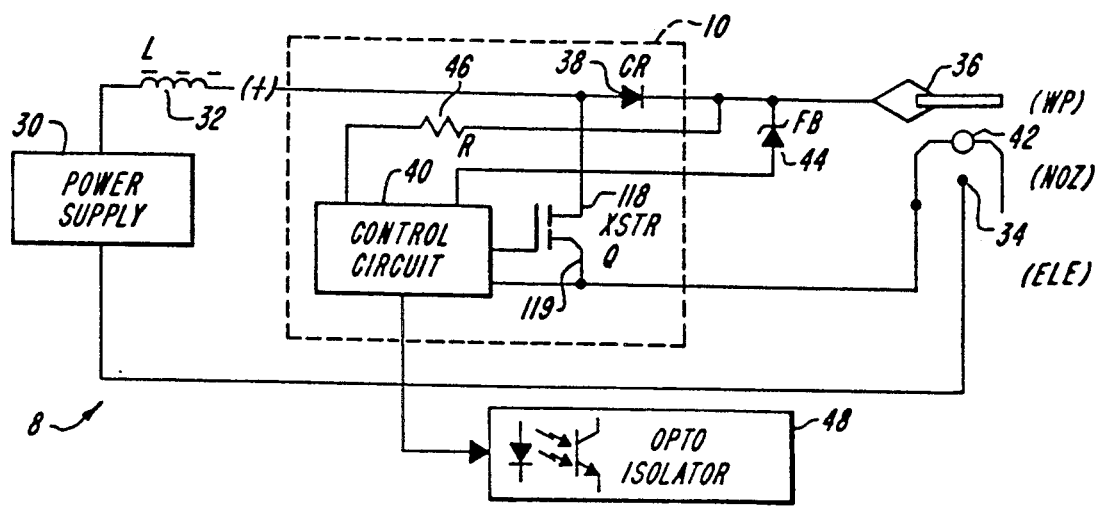
FIG. 2 is a block diagram of the plasma arc torch of the present invention.

The plasma arc transfer control circuit of the present invention comprises a pilot arc controller (PAC) 10 for controlling the transfer of a plasma arc from pilot arc operation to cutting arc operation in a plasma arc torch 8. FIG. 2 shows a highly simplified diagram of the PAC of the present invention. The power supply is inductive in nature and, therefore, in FIG. 2, the power supply is shown as comprising a power source 30 and an inductor 32. The negative node of the power supply is coupled to an electrode 34. The positive node of the power supply is coupled to the workpiece 36 through a freewheeling diode 38. A second path for the current out of the power supply is provided through the main electrodes (source 118 and drain 117) of transistor Q to the nozzle 42. Control circuit 40 senses the voltage differential between the workpiece 36 and the nozzle 42 and controls transistor Q so as to allow, over a preset range of voltages, an increasing amount of current to flow through the transistor to the nozzle as the sensed voltage differential increases. The transistor switch Q is on 100% of the time when the voltage differential is greater than the preset range of voltages and is off when the voltage differential is less than the preset range of voltages. Feedback of the workpiece voltage is provided to the control circuit 4g through zener diode 44. Power is supplied to the control circuit through resistor 46.

According to a second aspect of the present invention, the control circuit is also adapted to provide a signal through an opto isolator 48 to the power supply 30 which cause the power supply to decrease its output current when the voltage differential between the workpiece 36 and the nozzle 42 exceeds a third preset level. During normal cutting operation, the power supply 30 outputs a large amount of current, on the order of 40 amps, which is directed entirely towards the workpiece. When the torch is not cutting but still turned on, the plasma arc should attach to the nozzle causing the current from the power supply to flow through the nozzle back to the negative side of the power supply. When the plasma arc attaches to the nozzle, however, it is desirable to reduce the current of the output supply so as to prevent the nozzle from being melted by the heat of the high power plasma arc.

In the prior art, the transfer from cutting arc operation to pilot arc operation was manually controlled as described above in the Background of the Invention section. The control circuit of the present invention automatically transfers between pilot arc operation and cutting operation. In the present invention, the flow of current from the power supply 30 is transferred from the nozzle 42 to the workpiece 36 in a smooth, linear fashion as the workpiece and torch are brought together. It additionally increases the power output, as the power is transferred from the nozzle to the workpiece. The pilot arc control circuit of the present invention also provides the reverse transfer of power as the workpiece and torch are removed from each other.

The distance between the torch and the workpiece is determined by sensing the voltage differential between the workpiece 36 and the nozzle 42 in providing this voltage differential to the control circuit through a feedback loop. As the distance between the nozzle (the torch) and the workpiece increases, the workpiece to nozzle voltage rises due to beam interaction similar to that encountered in a vacuum tube with control grids.

Figure 3:
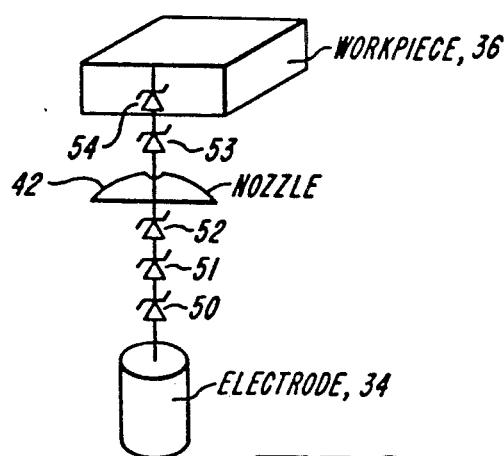
FIG. 3 is a highly simplified circuit, partly in perspective and partly schematic, demonstrating by analogy the voltage differential between the electrode, nozzle and workpiece in a plasma arc.

FIG. 3 shows a zener diode ladder analogy of this phenomenon. A certain voltage differential, represented by zener diodes 50, 51 and 52 exists between the electrode 34 and the nozzle 42. An even greater voltage differential, represented by diodes 50, 51, 52, 53 and 54 exist between the electrode and the workpiece. Therefore, the voltage differential between the nozzle 42 and the workpiece 36 is represented by zener diodes 53 and 54. As the distance between the nozzle and the workpiece increases, it would have the same effect as adding more zener diodes between the workpiece 36 and the nozzle 42. The voltage between the electrode and the nozzle, on the other hand, is fixed since the distance between the nozzle and electrode is fixed.

The PAC circuit 10 of the present invention operates in one of three modes. In the first mode, cutting arc operation, all current from power supply 30 is supplied through diode 38 to the workpiece 36. In the second mode, transfer arc operation, the transistor Q turns on and off at a rate of 20 kHz, the duty cycle depending on the sensed voltage differential. Although the cycle period of the switching remains constant, the amount of time per cycle during which the transistor is turned on increases as the voltage differential between the nozzle and workpiece increases. In the third mode, pilot arc operation, all current flows through transistor Q to the nozzle 42. Due to the nature of plasma, no current will flow to the workpiece when the path to the nozzle is available even though the path to the workpiece is simultaneously available. Therefore, when the transistor switch is forward biased, all current will flow through the transistor to the nozzle.

Figure 4:
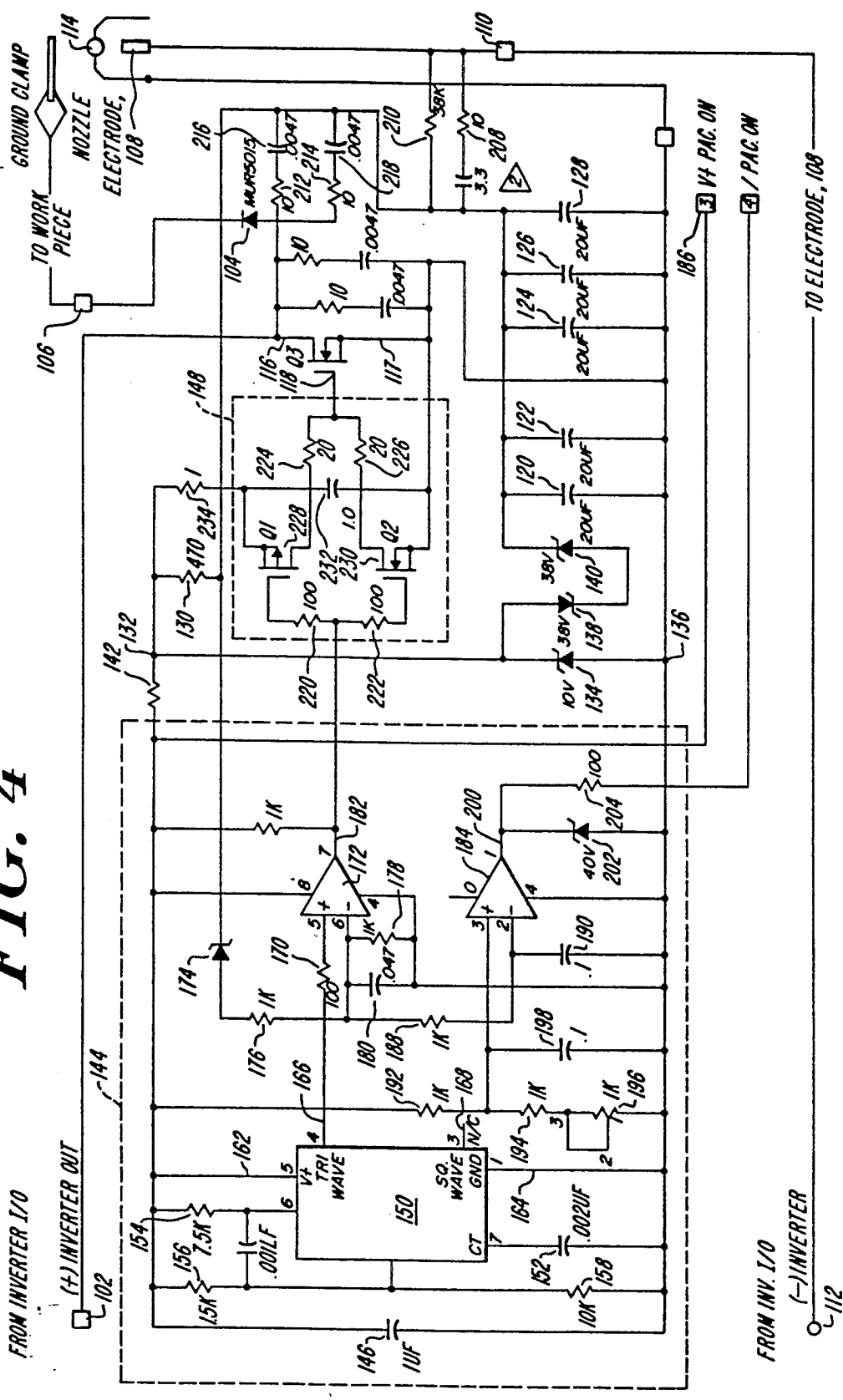
FIG. 4 shows a detailed schematic diagram of the plasma arc transfer control circuit of the present invention.

The structure and operation of the present invention will now be described in detail with respect to FIG. 4. The current from the power supply is fed into the pilot arc controller of FIG. 4 through node 102. The power source is highly inductive by nature and is a current source. Power levels range from 0 volts DC to over 200 volts DC with current ranging from 15 amps DC to 50 amps DC. During cutting arc operation, power normally flows out of node 102 through diode 104, to the workpiece which is coupled to node 106. The power essentially jumps through the plasma arc to electrode 108 and through node 110 to the negative node 112 of the power source. In this mode, the switching transistor Q is reverse biased by a signal at its gate 118 so that no significant amount of current flows out through the nozzle. However, due to the voltage differential between the workpiece, nozzle and electrode, a small current is drawn into the nozzle node 114 causing parallel coupled capacitors 120, 122, 124, 126 and 128 to charge up. As the distance between the nozzle and the workpiece increases the voltage differential between nodes 106 and 114 increases, causing the voltage across capacitors 120-128 to increase. As described immediately below, when the voltage across the capacitors exceeds a preset point, the signal into the gate 118 of the switching transistor Q will begin to switch at a specified rate (e.q., 20 kHz in a preferred embodiment), and the duty cycle of the switch will increase as the voltage across the capacitor increases until a 100% duty cycle is reached wherein transistor Q3 is on at all times. During the periods in which transistor Q3 is forward biased (i.e., on), essentially all of the current from the power supply through node 102 flows through the transistor switch to the nozzle as explained above, even though the path to ground through the workpiece is still available.

The power to run the PAC is sourced from the workpiece node 106 through resistor 130 to node 132. A small portion of the current from the power supply is drawn through resistor 130 to node 132. The voltage at node 132 is regulated to 18 volts by zener diode 134. Node 132 is the positive rail voltage of the circuit, while node 136 is the ground.

A backup power supply, consisting of diodes 138 and 140 is also provided. In the event that resistor 130 cannot charge the PAC circuit fast Enough, or the PAC malfunctions temporarily, the series combination of diodes 134, 138 and 140 prevents over-voltage of the power processing. These diodes also create a "suicide" circuit protector. If a loss of shunt regulation lasts long enough, then the zener diodes 134, 138 and 140 will burn out causing them to become short circuited, thus protecting the remaining circuitry from damage. These events, however, should not normally occur. However, if such a situation should arise, for example due to a technician shorting the controller power with a screwdriver momentarily, thus disabling the shunt regulator, the circuit will be protected.

Switching transistor Q is a large junction LSI field effect transistor. As such, it has a large gate-to-source capacitance on the order of 2,000 pico-farads. A gate-to-source voltage of +10 to +20 volts turns the switching transistor on. A gate-to-source voltage of 0 volts turns it off.

The means for generating the control signal at the gate 118 of switching transistor Q will now be described in detail. Block 144 comprise a modulator which produces a control signal at 118 of transistor Q as well as the signal to the power supply for controlling the level of current delivered thereby. Resistor 142 provides noise isolation and feeds capacitor 146, which is an RF bypass capacitor. Block 148 comprises a buffer amplifier which is necessary in order to allow the gate voltage to be rapidly switched. Integrated circuit 150 is a triangle wave generator. It is a generic Voltage Controlled Oscillator (VCO). Elements associated with the triangle wave generator 150 are as follows. Capacitor 152 is a timing capacitor. Resistor 154 is a timing resistor which, in conjunction with capacitor 152, controls the oscillation frequency of the triangle wave generator 150. Resistors 156 and 158 form a voltage divider which generates the voltage controlled oscillator's control port voltage. Capacitor 160 is an RF bypass for the current mirror associated with the control port. Pins 162 and 164 are $V_{cc}$ and ground, respectively, of the triangle wave generator 15g. Pin 166 is the triangle wave output. Pin 168 is a buffered square wave output, which is not used.

The triangle wave output on 166 is set to approximately $\frac{1}{4}$ the amplitude of the $V_{cc}$ voltage and has a minimum voltage of $\frac{1}{4}$ $V_{cc}$ and a maximum voltage of $\frac{1}{2}$ $V_{cc}$. The triangle wave is buffered internally to triangle wave generator 150 by a bi-polar transistor emitter follower. Resistor 170 is inserted between the emitter follower and comparator 172 to prevent oscillation of the follower and to establish transmission line impedance for this node.

The feedback network of this circuit begins with zener diode 174 which is coupled to the inverting input of the comparator 172 through the voltage divider comprising resistors 176 and 178. Zener diode 174 sets the offset voltage at which the circuit will begin to function. The voltage divider sets the loop gain of the circuit. Capacitor 180 in combination with resistor 178 forms a low pass filter.

The circuit operates as follows. As stated above, the voltage present across the parallel coupled capacitors 120-128 rises as the distance between the workpiece and nozzle increases. The voltage across the capacitors is the voltage differential between nodes 114 and 106, the voltage differential between the nozzle and the workpiece. This voltage is fed into the inverting input of the comparator 172 through the gain and offset network comprising zener diode 16, resistors 176 and 187 and capacitor 180. The non-inverting input of the comparator 172 is coupled to the triangle output 166 of the triangle wave generator 150. When the feedback voltage is less than the voltage at the lower tip of the triangle wave, comparator 172 outputs a low voltage from its output 182. This low voltage level propagates through buffer amplifier 148 to the base 118 of switching transistor Q reverse biasing it. This is cutting arc operation of the PAC circuit wherein all current goes to the workpiece through node 106. As the feedback voltage rises above the lower tip of the triangle wave, comparator 172 will temporarily output a high signal at its output 182 for that period of each cycle during which the triangle wave at the non inverting input is less than the feedback voltage at the inverting input. As the feedback voltage rises, the duty cycle of the comparator output will increase linearly with the increasing voltage until it reaches a 100% duty cycle when the sensed voltage is equal to the upper tip of the triangle wave. When the sensed voltage is greater than the bottom tip of the triangle wave but less than the upper tip of the triangle wave, the PAC circuit is in the second mode, transfer arc operation. As described above, in this mode, the switching transistor Q apportions the current from the power source between node 106 (the workpiece) and node 124 (the nozzle), the portion sent to node 114 with increasing feedback voltage.

Finally, when the sensed feedback voltage exceeds the upper tip voltage of the triangle wave, the output of comparator 172 is at a constant active low level. This high output of the comparator 172 turns transistor Q on whereby all current from the power source flows through transistor Q to the nozzle at node 114. This is the third mode of operation, pilot arc operation wherein the plasma arc attaches between the nozzle and the electrode.

In another aspect of the invention, the sensed feedback voltage is also used to control the power source. At a preset sensed feedback voltage, the power supply controller lowers the power supply current level from the cutting arc operation level to the pilot arc operation level and vice versa. The power control feedback system operates as follows. A second comparator, comparator 184 compares the feedback voltage with a preset reference voltage and provides its output to node 186 which is coupled to the power supply controller (not shown in FIG. 4). The feedback voltage which is presented at the inverting input of the first comparator 172 is also provided to the inverting input of the second comparator 184 through a low pass filter comprising resistor 188 and capacitor 190. The preset reference voltage is provided at the non-inverting input of comparator 184. The preset reference voltage is generated by taking $V_{cc}$ of the PAC circuit through an adjustable voltage divider comprising resistors 192 and 194 and variable potentiometer 196. The reference voltage is filtered by the combination of resistors 192 and 194, potentiometer 196 and capacitor 198. When the sensed feedback voltage at the inverting input rises above the preset reference voltage at the non-inverting input of comparator 184, the comparator output at 200 switches from passive high to active low. The output 200 of the comparator 184 is presented at node 186 to the power supply controller. The power supply controller interfaces with the output of the comparator 184 through an opto-isolator 48. Opto isolator Model No. 6N139 sold by Hewlett Packard is one possible opto isolator which is suitable for use in the present invention. When the sensed feedback voltage is less than the preset reference voltage, the output 200 of comparator 184 is high. The power supply controller, which is not shown in FIG. 4, is designed to control the power supply to output cutting level current (e.g., 40 amps for Plasma Arc Torch Model No. MAX 42 manufactured by Hyperpower Inc.) when the signal at node 186 is high and pilot arc current level (approximately 15 amperes in the HyperPower Plasma Arc Torch Model No. MAX 42) when the signal at node 186 is low. The above current ratings are exemplary only and it should be understood that plasma arc torches are available with cutting current levels of anywhere from approximately 30 amps to approximately 1000 amps. Zener diode 202 is provided for transient protection of the comparator output. Resistor 204 is used in conjunction with zener diode 202 for transient protection.

In the preferred embodiment, the preset reference voltage is set at a value somewhere between the lower tip and the upper tip of the triangle wave. Therefore, while the PAC circuit is in the second mode, transfer arc operation, when the distance between the nozzle and the workpiece is less than the specified length, the power supply is still supplying full current which is being apportioned between the workpiece and the nozzle. When the distance between the workpiece and the nozzle exceeds a preset length, the current level ramps downward to a second preset level for pilot arc operation while still in the second mode. The contrary is also true wherein the workpiece and nozzle are brought closer together.

Additional features of the circuit of the present invention will now be described. Plasma, as an electrical load is best described as a white noise sink. Its frequency spectrum extends from DC to approximately blue light. In the time domain, when properly matched, the voltage and current look like a series of single arcs of approximately 10 microseconds duration. The pulse amplitude and position are completely random. The pulse duration is the only attribute which is nominally consistent.

Therefore, if any passive or active resonances exist in the electrical circuit, the resonance will receive a driving force because the plasma will contain energy at that frequency. Typical resonances encountered in a plasma arc torch include:

(1) electronic power control feedback loop servo, (2) the inductance of the cables in the torch and capacitance of any RF bypass capacitors connected across the cables, (3) the inductance of the torch cables and the capacitance of any capacitor attached differentially across the plasma, (4) the distributed cable inductance and capacitance, (5) transmission line effects attributed to the torch cable length and transmission line complex impedance, (6) the acoustic dynamics of the plasma can also appear as a tone in the electrical domain frequency spectrum of the load power.

Therefore, damping must be provided for any possible resonances in the electrical system. Capacitor 206 and resistor 208 form a torch matching network (TMN) which damps the circuit by setting the complex impedance of the power delivered to the plasma. Resistor 210 is provided for safety reasons and discharges capacitor 206. Further, RF damping is provided for power diode 104 by resistors 212 and 214 and capacitors 216 and 218.

As stated above, block 148 is a buffer amplifier interposed between the output 182 of comparator 172 and the base 118 of the switching transistor Q. This buffer amplifier is necessary to allow high frequency switching of transistor Q. The buffer amplifier consists of resistors 220, 222, 224 and 226, transistor 228 and 230 and capacitor 232. Resistor 234 isolates power to the buffer from other devices in the PAC circuit. Capacitor 232 stabilizes the power for the buffer. Transistors 228 and 230 form a common drain inverting saturated voltage buffer. Resistors 224 and 226 prevent large currents from flowing during cross conduction time when both transistors 228 and 230 are on. Finally, resistors 220 and 222 prevent parasitic oscillations in the transistors 228 and 230. They also set the bandwidth of the buffer.

Having thus described one particular embodiment of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. An apparatus for controlling transfer of a plasma arc originating at a cathode between a first and a second anode, said apparatus comprising:
    means for providing an electrical current to said first anode,
    means for sensing a voltage difference between said first and said second anode, and
    transfer control means, responsive to said voltage differential, for providing (a) all current to said first anode when said voltage differential is less than a specified value X, (b) all current to said second anode when said voltage differential exceeds a specified value Y, where Y is greater than X, (c) an increasing portion of said current to said second anode as said voltage difference increases between X and Y, and (d) an increasing portion of said current to said first anode as said voltage differential decreases between X and Y.

2. An apparatus as set forth in claim 1 wherein, when said voltage differential is at a value between X and Y, the portion of current provided to said second anode increases as said voltage differential increases.

3. An apparatus as set forth in claim 2 wherein said transfer control circuit comprises;
    switch means having a first terminal coupled to said means for providing current and said first anode and a second terminal coupled to said second anode, said switch having a first position in which said first and second terminals are disconnected and a second portion in which said first and second terminals are connected,
    means for controlling said switch such that, when said voltage differential is at a value between X and Y, said switch alternates between said first and second positions at a specified frequency having a period T, said switch spending an increasing portion of period T in said second position as said voltage differential increases.

4. An apparatus as set forth in claim 2 wherein said transfer control means comprises;
    a transistor having a drain coupled to said power source and said first anode, a source coupled to said second anode and a gate coupled to receive a control signal, and
    means for producing a control signal which comprises a first level insufficient to turn on said transistor when said voltage differential is less than X, comprises a second level which is sufficient to turn on said transistor when said voltage differential is greater than Y and, when said voltage is between X and Y, which comprises a pulse train,
    wherein said pulse train comprises a series of cycles of period T wherein said control signal is at said first level for a portion of T of each cycle and at said second level for the remaining portion of T of each cycle and wherein the portion of T during which said control signal is at said second level increases as said voltage differential increases.

5. An apparatus as set forth in claim 4 wherein said first anode is coupled to said drain and said power source through a freewheeling diode.

6. An apparatus as set forth in claim 5 wherein said means for producing said control signal comprises;
    means for producing a periodic reference signal of uniform shape and size each period of said reference signal having a maximum amplitude equal to Y and a minimum amplitude equal to X,
    means for comparing said voltage differential with said periodic reference signal to produce said control signal such that said control signal is at said first level when said voltage differential is less than said periodic reference signal, and is at said second level when said voltage differential is greater than said periodic reference signal.

7. An apparatus as set forth in claim 6 wherein said periodic reference signal is a triangle wave and said means for comparing comprises a comparator.

8. An apparatus for controlling the transfer of a plasma arc originating at a cathode between a first and a second anode, said apparatus comprising:
    means for providing an electrical current to said first anode,
    means for sensing a voltage differential between said first and said second anode,
    means, responsive to said sensing means, for altering the magnitude of said electrical current provided to said first anode in response to changes in said voltage differential such that said electrical current is set at a first level when said voltage differential is greater than a preset voltage signal and is set at a second level when said voltage differential is less than a preset voltage signal, and,
    transfer control means, responsive to said voltage differential, for providing an increasing portion of said current to said second anode as said voltage differential increases.

9. An apparatus as set forth in claim 8 wherein said means for altering said magnitude of said current comprises:
    comparator means for comparing said voltage differential with said preset voltage signal, said comparator means outputting a power control signal which is at a first level when said voltage differential exceeds said preset voltage signal and at a second level where said voltage differential is less than said preset voltage signal.

10. In a plasma torch having an electrode for receiving current through a stream of gas to produce a plasma arc for cutting a workpiece and a nozzle for receiving said plasma arc when said workpiece is removed from the vicinity of the electrode, a transfer arc control apparatus comprising:
    means for sensing a voltage differential between the nozzle and the workpiece, and,
    transfer control means, responsive to said voltage differential, for (a) providing all current to said workpiece when said voltage differential is less than a specified value X, (b) providing all current to said nozzle when the voltage exceeds a specified value Y, where Y is greater than X, and (c) dividing said current between said workpiece and said nozzle when said voltage differential is between X and Y such that and increasing portion of said current is delivered to said nozzle as said voltage differential increases, and an increasing portion of said current is delivered to said workpiece as said voltage differential decreases.

11. An apparatus as set forth in claim 10 wherein, when said voltage differential is at a value between X and Y, the portion of current provided to said nozzle increases as said voltage differential increases.

12. An apparatus as set forth in claim 11 wherein,
said current received at said electrode through said plasma arc is produced by a current source, and,
wherein said transfer control circuit comprises,
switch means having a first terminal coupled to said workpiece and said current source and a second terminal coupled to said nozzle, said switch having a first position in which said first and second terminals are disconnected and second position in which said first and second terminals are connected, and
means for controlling said switch such that, when said voltage differential is at a value between X and Y, said switch alternates between said first and second positions at a specified frequency having a period T, said switch spending an increasing portion of period T in said second position as said voltage differential increases.

13. An apparatus is set forth in claim 12 wherein said workpiece is coupled to said first terminal of said switch means and said current source through a freewheeling diode.

14. An apparatus as set forth in claim 11 wherein said transfer control means comprises;
a transistor having a drain coupled to said current source and said workpiece, a source coupled to said nozzle and a gate coupled to receive a control signal, and
means for producing a control signal which comprises a first level insufficient to turn on said transistor when said voltage differential is less than X, comprises a second level which is sufficient to turn on said transistor when said voltage differential is greater than Y and, when said voltage is between X and Y, which comprises a pulse train,
wherein said pulse train comprises a series of cycles of period T wherein said control signal is at said first level for a portion of T of each cycle and at said second level for the remaining portion of T of each cycle and wherein the portion of T during which said control signal is at said second level increases as said voltage differential increases.

15. An apparatus as set forth in claim 14 wherein said workpiece is coupled to said current source and said drain through a freewheeling diode.

16. An apparatus as set forth in claim 15 wherein said means for producing said control signal comprises;
means for producing a periodic reference signal of uniform shape and size each period of said reference signal having a maximum amplitude equal to Y and a minimum amplitude equal to X,
means for comparing said voltage differential with said periodic reference signal to produce said control signal such that said control signal is at said first level when said voltage differential is less than said periodic reference signal, and is at said second level when said voltage differential is greater than said periodic reference signal.

17. An apparatus as set forth in claim 14 wherein said periodic reference signal is a triangle wave and said means for comparing comprises a comparator.

18. In a plasma torch having an electrode for receiving current through a stream of gas to produce a plasma arc for cutting a workpiece and a nozzle for receiving said plasma arc when said workpiece is removed from the vicinity of the electrode, a transfer arc control apparatus comprising:
means for sensing a voltage differential between said nozzle and said workpiece, and,
means, responsive to said means for sensing, for altering the magnitude of said current in response to changes in said voltage differential.

19. An apparatus as set forth in claim 18 further comprising means for altering the magnitude of said current in response to said voltage differential such that said current magnitude is set at a first level when said voltage differential is greater than a preset reference voltage signal and is set at a second level when said voltage differential is less than said preset reference voltage signal.

20. An apparatus as set forth in claim 19 wherein said means for altering said magnitude of said current comprises;
comparator means for comparing said voltage differential with said preset voltage signal, said comparator means outputting a power control signal which is at a first level when said voltage differential exceeds said preset voltage signal and at a second level where said voltage differential is less than said preset voltage signal, and
means for regulating said current magnitude to said first level when said power control signal being at said first level and regulating said current magnitude to said second level when said power control signal is at said second level.

21. In a plasma torch having an electrode for emitting current into a stream of gas to produce a plasma arc for contacting a workpiece and a nozzle for receiving said plasma arc when said workpiece is removed from the vicinity of said electrode, a transfer arc control apparatus comprising;
means for sensing a voltage differential between said nozzle and said workpiece, and,
transfer control means, responsive to said voltage differential, for dividing said current between said nozzle and said workpiece such than an increasing portion of said current is delivered to said nozzle as said voltage differential increases.

22. A power transfer control circuit in a plasma arc torch for controlling transfer of a plasma arc having one end of said arc attached to an electrode, said circuit controlling the transfer of a second end of said plasma arc between a nozzle of the torch and a workpiece which is to be cut by said torch, comprising;
a power source for producing a current output,
means coupling said workpiece to a positive supply side of said power source,
means coupling said electrode to a negative supply side of said power source,
a switching transistor having a drain node coupled to said positive supply side, a source node coupled to said nozzle and a gate node coupled to receive a transfer control signal, a comparator having an output coupled to said gate node, an inverting input and a non inverting input, a triangle wave generator having an output coupled to said non inverting input of said comparator, said triangle wave having a maximum and a minimum amplitude per cycle, a capacitor coupled between said workpiece and said nozzle, and means for providing the voltage across said capacitor to the non-inverting input of said comparator, whereby, when said voltage across said capacitor is less than said minimum amplitude of said triangle wave, said switching transistor is reverse biased by the output of said comparator to said gate node, when said voltage across said capacitors is greater than said maximum amplitude of said triangle wave, said switching transistor is forward biased and, when said voltage across said capacitors is between said maximum and said minimum, said switching transistor is switched between forward and reverse biasing with a duty cycle dependent on the voltage across said capacitor.

23. A circuit as set forth in claim 22 further comprising;

power source control means for regulating the current output of said power source to a first level in response to a control signal at a first level and to a second level in response to said control signal being at a second level, said power source control means having an input for accepting said control signal, a second comparator having an output coupled to said input of said power source control means to provide said control signal thereto, a non-inverting input coupled to receive said voltage across said capacitor and an inverting input coupled to receive a preset power control reference voltage, whereby, when said voltage across said capacitor is greater than said preset power control reference voltage, said power control signal is at said first level, and, when said voltage across said capacitor is greater than said preset power control reference voltage, said power control signal is at said second level.

24. An apparatus as set forth in claim 22 further comprising, first damping means for RF damping of said free-wheeling diode, second dampinq means for damping resonance in said switching transistor, a buffer amplifier coupled between said triangle wave generator and said transistor, and third dampinq means for setting the complex impedance of the power delivered to the plasma arc.

25. A method of automatically transferring one end of a plasma arc between a workpiece and a nozzle in a plasma arc torch, wherein another end of said plasma arc is attached to a torch electrode, comprising the steps of;

coupling said workpiece to a current source, coupling said nozzle to said current source through a switch, sensing the distance between the workpiece and the nozzle, apportioning the current supplied by said current source between said workpiece and said nozzle, wherein the ratio of said apportionment is responsive to said distance.

26. A method as set forth in claim 25 wherein the said distance is sensed by sensing the voltage differential between said workpiece and said nozzle.

27. A method as set forth in claim 26 wherein the amount of current apportioned to said nozzle increases as said voltage differential increases.

28. A method as set forth in claim 27 wherein said switch supplies all current to said workpiece when said voltage differential is below a preset lower level, supplies all current to said nozzle when said voltage differential exceeds a preset upper level, and switches between supplying said current to said workpiece and to said nozzle at a specified switching frequency, the duty cycle increasing as said voltage differential increases, when said voltage differential is between said preset upper and lower levels.

* * * * *